United States Patent

[11] 3,543,866

| [72] | Inventors | Arthur Clifford Howard;<br>John Arthur Howard, West Horndon, England |
|---|---|---|
| [21] | Appl. No. | 625,499 |
| [22] | Filed | March 23, 1967 |
| [73] | Assignee | Rotary Hoes Limited<br>West Horndon, Essex, England |
| [32] | Priority | Mar. 31, 1966 |
| [33] |  | Great Britain |
| [31] |  | 14,206/66 |

[54] EARTH-WORKING ROTOR FOR A CULTIVATING MACHINE
1 Claim, 3 Drawing Figs.

[52] U.S. Cl. .................................... 172/548, 172/770
[51] Int. Cl. ........................................ A01b 21/02
[50] Field of Search........................... 172/548, 540, 546, 547, 121, 123, 177, 549, 770

[56]     References Cited
UNITED STATES PATENTS

| 2,408,337 | 10/1959 | Suprise et al. ............... | 172/549 |
| 1,449,584 | 3/1923 | Butler........................... | 172/548 |
| 1,703,539 | 2/1929 | Ohlson ........................ | 172/548 |
| 2,168,733 | 8/1939 | Dufour......................... | 172/548 |

FOREIGN PATENTS

| 220,931 | 4/1892 | France ........................ | 172/548 |

Primary Examiner— Robert E. Pulfrey
Assistant Examiner— Ronold C. Harrington
Attorney— Mawhinney & Mawhinney ABSTRACT: The transverse rotor of a cultivating machine has circumferential rows of L-shaped blades which are all directed towards one end of the rotor and have their lateral limbs divergent so as to cut laterally-declining channels in the subsoil, and to tear the clods cut by one row from those cut by the next succeeding row so as to leave an open texture through which moisture in the clods can drain away.

Patented Dec. 1, 1970
3,543,866
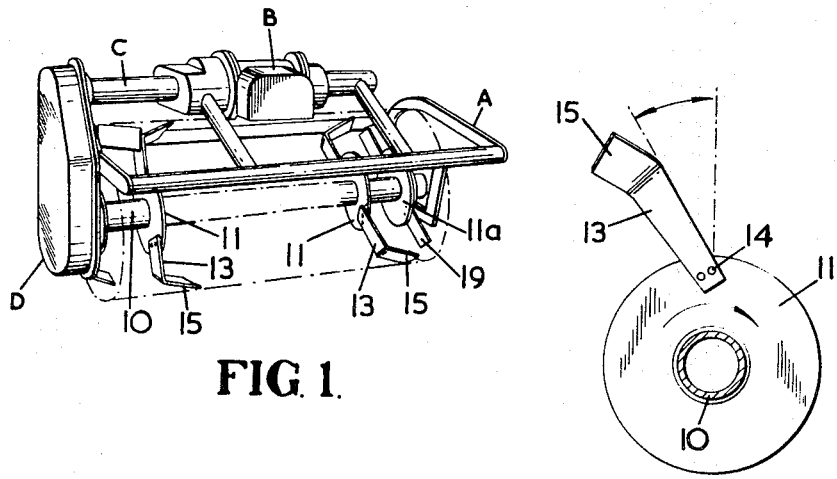
FIG. 1.
FIG. 3
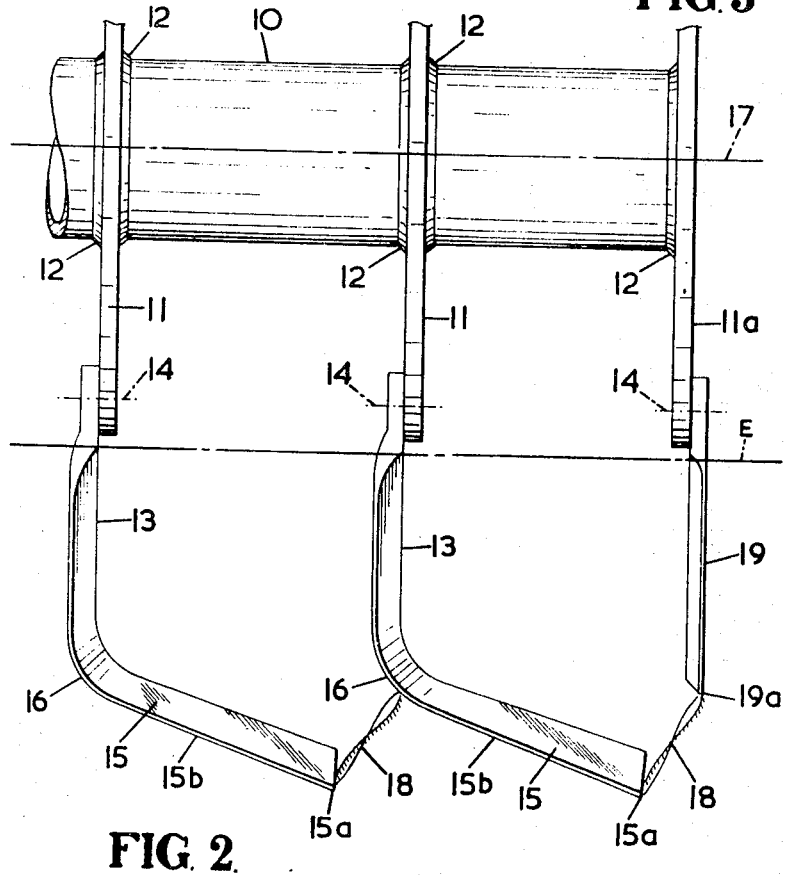
FIG. 2.
INVENTORS:-
ARTHUR CLIFFORD HOWARD &
JOHN ARTHUR HOWARD
BY:-
ATTORNEY

EARTH-WORKING ROTOR FOR A CULTIVATING MACHINE

The invention relates to an earth-working rotor of the kind which has a driven shaft provided with axially-spaced circumferential rows of earth-working blades which are substantially of L-shape in an edge view with the tops of the vertical limbs of the "L" secured to the shaft and the lateral limbs extending in the axial direction of the shaft, and which is to be arranged, with its axis transverse to the direction of travel of a cultivating machine, to be driven in the sense in which it would roll but at a greater speed so that the blades cultivate the ground. The main object of the invention is to enable ground to be cultivated in the form of heavy clods which are adapted for contained water to drain away.

According to the invention, in an earth-working rotor of the kind set forth, the substantially L-shaped blades are arranged with their lateral limbs directed towards one end of the rotor shaft at such an angle from its axis that their tips are spaced radially-outwards of the elbows of the blades in the next succeeding row. In this way the lateral limbs of the blades in the circumferential rows leave the soil beneath the clods they have cut in the form of uniformly laterally declining steps which facilitate the draining away of water from the clods, and the radial spacing between the tips of the lateral limbs of one blade row from the elbows of the blades in the next succeeding row results in the clods cut by one blade row being torn from the clods cut by the preceding blade row such that the blades do not trowel the lateral sides of the clods but leave them of an open texture to facilitate the drainage of water therefrom.

According to a feature of the invention the vertical limbs of the blades are set at a trailing angle to a radial plane. By thus setting the said vertical limbs of the blades they act on the clods to turn them over into an inverted position.

According to a further feature, the rotor shaft, at the end towards which the lateral limbs diverge, is provided with at least one radial cutting blade, of which the tip is spaced radially inwardly from the tip of the lateral limbs of the blades in the preceding row.

The invention is exemplified by the accompanying drawings, in which:

FIG. 1 is a rear elevation of one form of the rotor shown journaled in the frame of a cultivating machine which is adapted to be connected to the rear of a tractor, of which latter a power takeoff shaft is connected to drive the rotor;

FIG. 2 is an enlarged rear elevation of the right-hand end of the rotor of FIG. 1, but with the blades omitted from the upper side of the rotor shaft, and FIG. 3 is a cross section through the rotor shaft illustrating a modification.

Referring firstly to FIG. 1 a hollow rotor shaft 10 is shown journaled at its ends in framework A of the cultivating machine, and the framework supports a gear box B which receives drive from the power takeoff shaft of the tractor (not shown) and transmits it by a shaft within a tubular casing C to a chain and sprocket drive within chain casing D to the rotor shaft.

Shaft 10 has axially-spaced radial flanges 11 welded to it at 12, and these flanges, with the exception of the right-hand end one 11a in FIGS. 1 and 2, each serve to support a circumferential row (e.g. two, or three) of earth-working blades which, in an edge view, are substantially L-shaped. The blades of the rows are preferably arranged helically about the rotor axis from one end of the rotor to the other.

The vertical limbs 13 of the blades are bolted to the flanges at 14, and their lateral limbs 15 diverge from the blade elbow 16 at such an angle (e.g. 20°) to the rotor axis 17 that they fall on the peripheries of respective, notional, coaxial and equal cones having their bases in the plane of end flange 11a, and their tips 15a radially outward from the elbow 16 of the (e.g. succeeding blade row.

Thus, as shown by FIG. 2, the leading cutting edge 15b of each lateral limb, when embedded substantially to the depth indicated below ground level E, cuts a laterally declining step in the soil which remains after the clods are cut so that water contained in the clods, or which falls on them during rainy weather can drain away into the valleys between the steps. This prevents the clods from becoming waterlogged.

Also, owing to the radial clearance between the tips 15a of one blade row and the elbows 16 of the rightwardly succeeding blade row the soil interconnecting adjacent rows of the clods being cut is torn as indicated by the shaded areas 18 instead of being cut by a blade as hitherto. This results in the lateral sides of the steps being of an open texture so as to facilitate the draining away of moisture which would otherwise collect in the said valleys. It also facilitates draining moisture from the clods themselves.

It will be appreciated that the rightmost row of clods in the illustration have their outer edges cut by radial blades 19 fast with flange 11a, and that the tips 19a of these radial blades act in conjunction with the tips 15a of the adjacent row of L-shaped blades in producing a torn outer edge for the clods dug by that row and for the associated valley.

Preferably, and as shown in FIG. 3, the vertical limbs 13 of the L-shaped blades are set at a trailing angle of about 28° to 30° from a true radial plane of axis 17. This, in conjunction with the sloping lateral limbs 15 enables the blades to tip the clods sidewise into an inverted position.

We claim:

1. An earth-working rotor, to be journaled transversely in a cultivating machine, comprising a shaft, a plurality of earth-working blades of L-shape in an edge view, said blades attached to said shaft by the upright limbs of their L-shaped formation to said shaft with the planes of said upright limbs radial to said shaft and with said blades arranged in a plurality of circumferential rows axially spaced along said shaft, said L-shaped blades having their lateral limbs diverging towards one end of said shaft with radial clearance between their tips and the junctions between the upright and lateral limbs of the blades in that blade row which is next adjacent to it in the direction of the said one end of said shaft wherein the improvement comprises, the tips of the blades being arranged closely adjacent a radial plane containing the radial upright limbs of the blades in that blade row which is next adjacent to it in the direction of the said one end of said shaft, whereby the lateral limbs cut smooth steps in the soil whilst the soil between the tip of each blade and the elbow of the blade in the row which is next adjacent to it is torn to provide an open texture.

2. An earth-working rotor according to claim 1, in which the upright limbs of the blades are set at a trailing angle to a notional radial plane passing through the axis of the shaft.

3. An earth-working rotor, according to claim 1, in which the shaft, at the end towards which the lateral limbs diverge, is provided with a radial cutting blade for each L-shaped blade of the row adjacent that end of said shaft, said radial cutting blades having their tips spaced radially inwardly from the tips of the respective L-shaped blades in the said adjacent row.

4. An earth-working rotor, to be journaled transversely in a cultivating machine, comprising a shaft, a plurality of earth-working blades of L-shape in an edge view, said blades attached to said shaft by the upright limbs of their L-shaped formation to said shaft with the planes of said upright limbs radial to said shaft and with said blades arranged in a plurality of circumferential rows axially spaced along said shaft, said L-shaped blades having their lateral limbs diverging towards one end of said shaft with radial clearance between their tips and the junctions between the upright and lateral limbs of the blades in that blade row which is next adjacent to it in the direction of the said one end of said shaft wherein the improvement comprises, the shaft, at the end towards which the lateral limbs diverge, being provided with a radial cutting blade for each L-shaped blade of the row adjacent that end of said shaft, said radial cutting blades having their tips spaced radially inwardly from the tips of the respective L-shaped blades in the said adjacent row, whereby the lateral limbs of the respective L-shaped blades in the said adjacent row cut smooth steps in the soil whilst the soil between the tips of said respective Lsshaped blades and the tips of said radial cutting blades is torn to provide an open texture.